I. M. RIGGS.
FLOUR AND FRUIT SIEVE.
APPLICATION FILED OCT. 20, 1916.

1,245,619.

Patented Nov. 6, 1917.

Inventor
Irene M. Riggs,
By
Z. J. Geisler
Atty.

UNITED STATES PATENT OFFICE.

IRENE M. RIGGS, OF ASTORIA, OREGON.

FLOUR AND FRUIT SIEVE.

1,245,619.   Specification of Letters Patent.   Patented Nov. 6, 1917.

Application filed October 20, 1916. Serial No. 126,806.

*To all whom it may concern:*

Be it known that I, IRENE M. RIGGS, a citizen of the United States, and a resident of Astoria, county of Clatsop, State of Oregon, have invented a certain new and useful Improvement in Flour and Fruit Sieves, of which the following is a specification.

The object of my invention is to provide the housewife with a convenient and sanitary device which is adapted to be used both as a flour sifter and fruit sieve; the device being, furthermore, provided with a funnel attachment, so that when used as a flour sifter the contents may be discharged into a small vessel, such as a teacup. Also to so arrange the device that it is adapted to strain fruit juices, starch, etc., without spilling or splashing over the receptacle. A further purpose of my invention is to so make the same that it may be manufactured at small cost, and may be put in compact form for shipping. Furthermore, to render the parts removable, so that each part may be easily and thoroughly washed.

The details of construction of my device are more readily understood by having reference to the accompanying drawings, in which.

My device consists of a body, $a$, which may be made of tinned sheet-iron; it is provided with pressed-out stiffening ribs, as $b$. At $c$ the body is formed with an outward peripheral recess, and at $d$ with an inward contraction, the recess $c$ serving as a seating space for the rim $e$ of the sieve, and the shoulders of the recess serving to hold the rim of the sieve firmly in place. To the base of said rim is fastened a half round sieve body $f$. The rim $e$ is made with perforations, and the body is made with corresponding perforations, for receiving the shank of the pin $g$. The extremity $g'$ of the latter is threaded, and the body, $a$, of the sieve is provided with a reinforcement or boss $h$, which is threaded to receive said shank end $g'$. The head $g^2$ of the pin $g$ is made knob-form, and is preferably made with a concave face at $g^3$, leaving a rather sharp peripheral edge, which, when the pin is screwed up tight in the boss $h$, has a tendency to form a liquid-tight joint with the exterior of the body $a$.

Within the sieve there is removably and rockably mounted an agitator $i$, which comprises a plurality of blades $i'$. As shown, the agitator is made with three curved blades which are joined together at their upper ends, and have perforations $i^2$ for receiving the shank of the pin $g$. The handle $i^3$ of the agitator may be made of wire, as shown, the handle portion projecting some distance above the body, $a$, so as to be conveniently seized by the fingers for rocking the agitator in the sieve.

As apparent, by removing the pin $g$ the agitator may be removed, and likewise the sieve sprung out of its seat in the recess $c$, and the parts may then be thoroughly washed. The same arrangement also renders the removal of the agitator convenient when my device is to be used for straining fruits, or otherwise, in which the agitator is not required.

The lower end of the body, $a$, is made with a thread as at $j$, for having removably affixed thereon the funnel $k$. The purpose of making the funnel $k$ removable is to facilitate the thorough cleaning of my device.

Figure 2:
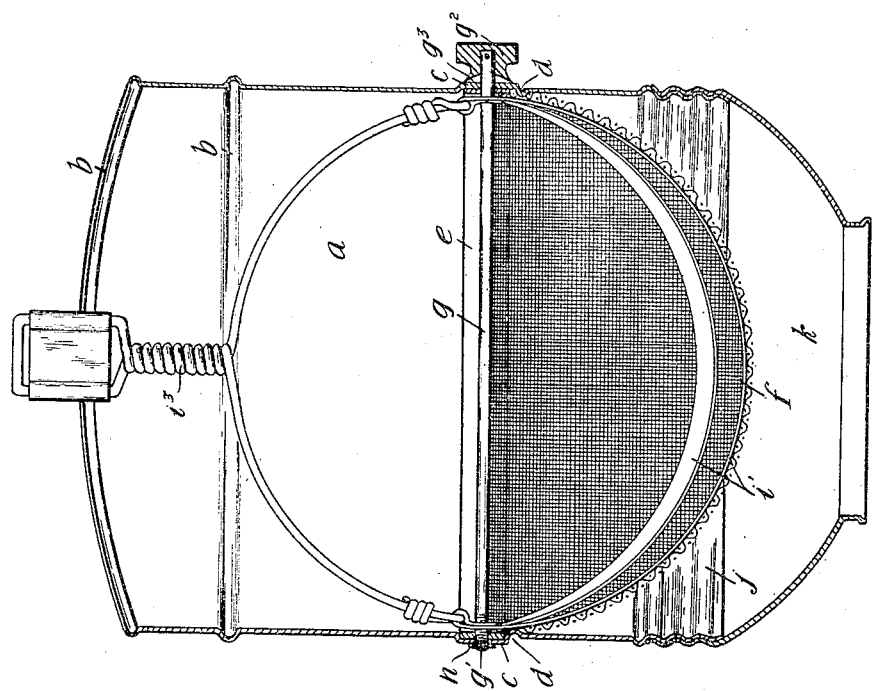
Fig. 2 is a sectional elevation on line 2—2 of Fig. 1.
Figure 1:
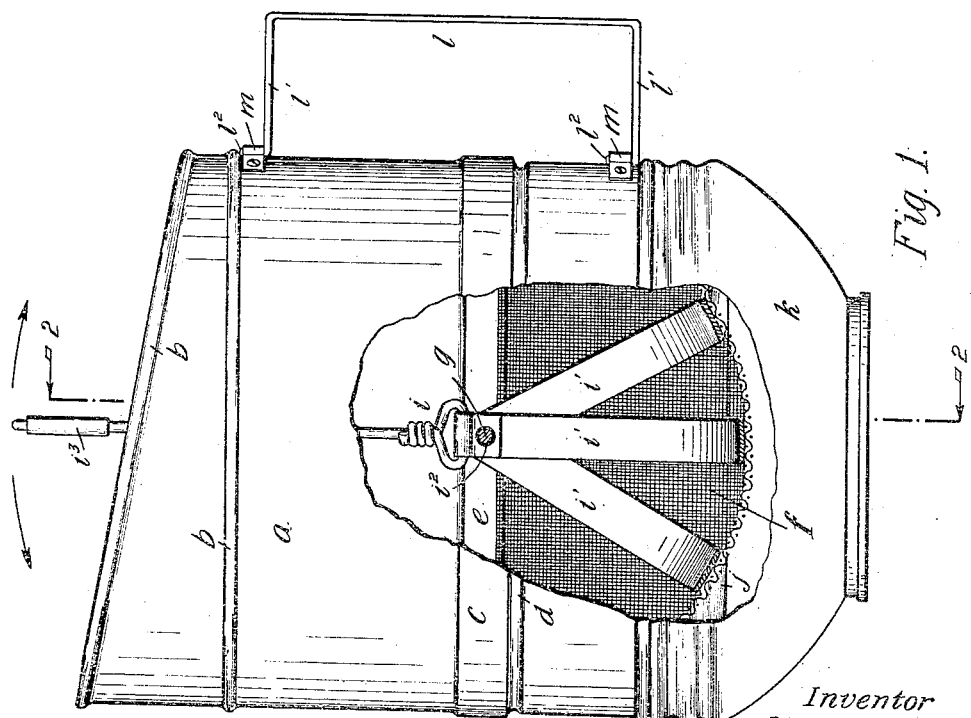
Figure 1 is a side elevation with part of casing broken away.

For the purpose of facilitating shipment, I prefer to make the handle $l$ removable. To this end the body is provided with ears $m$, $m$, and the ends $l'$ of the handle $l$ are provided with bent portions $l^2$ as shown in Fig. 1, whereby the handle ends are adapted to be easily inserted in the ears $m$, $m$, or removed therefrom; in the later case for the purpose of placing the handle within the body of my device in the shipment thereof.

I claim:

1. In a device of the character described, the combination of a body made at the middle portion with an outwardly formed peripheral recess, the latter being made with opposite holes, a sieve having a band adapted for being sprung into said recess, and said band being also provided with opposite holes, and a pin inserted through the holes of said body and said band of the sieve, said pin being provided with a knob made with a bearing face which is concaved and the periphery of which is adapted to provide a sharp seating edge serving the purpose specified.

2. In a device of the character described, the combination of a body made at the middle portion with an outwardly formed peripheral recess, the latter being made with opposite holes, a sieve having a band adapted for being sprung into said recess, and said band being also provided with opposite holes, and a pin inserted through the holes of said body and said band of the sieve, said pin being provided with a knob made with a bearing face which is concaved and the periphery of which is adapted to provide a sharp seating edge serving the purpose specified, the outer extremity of said pin being threaded into the hole therefor provided in the body.

IRENE M. RIGGS.

Copies of this patent may be obtained for five cents each, by addressing the "Commissioner of Patents, Washington, D. C."